Patented Aug. 19, 1952

2,607,754

UNITED STATES PATENT OFFICE 2,607,754

COPOLYMERS OF VINYL CHLORIDE, ALLYL GLYCIDYL ETHER, AND AN ALLYLOXYALKANOIC ACID

Ellsworth K. Ellingboe and Henry Shirley Rothrock, Wilmington, Del., assignors to E. I. du Pont de Nemours & Company, Wilmington, Del., a corporation of Delaware No Drawing. Continuation of application Serial No. 170,704, June 27, 1950. This application June 29, 1951, Serial No. 234,455

9 Claims. (Cl. 260—45.2)

This invention relates to polymeric materials and, more particularly, to certain new copolymers of vinyl chloride.

Many coating or moulding compositions based on vinyl chloride polymers and copolymers have been described and some have achieved commercial success. However, in spite of their economic and technical advantages, the prior compositions leave much to be desired in respect to certain important properties such as initial solubility, final film insolubility and non-thermoplasticity, heat resistance, and hardness. In particular, the vinyl chloride polymer compositions heretofore known are not readily amenable to heat-curing (i. e., insolubilization upon heat treatment) and they lack thermal stability, as evidenced by the embrittlement, discoloration, and general decomposition they undergo when subjected to heat and/or light. There was a need for a thermosetting film-forming composition having the desirable properties of copolymers of vinyl chloride, but which would also offer the advantage of good initial solubility coupled with heat curability to an insoluble, heat-resistant, print-resistant, hard film.

An object of the present invention is to provide a new film-forming, heat curable copolymer. A further object is to provide such a copolymer which is initially soluble in common organic solvents but which is readily converted by heat curing to an insoluble product characterized by excellent thermal stability and stability to light. A still further object is to provide such a copolymer which, upon heat curing, will give a heat-resistant, print-resistant, hard film. Other objects will be apparent from the description of the invention given hereinafter.

The above objects are accomplished according to the present invention by providing a copolymer, the polymeric components of which essentially consist of, by weight, 70%–85% polymerized vinyl chloride, 10%–28% polymerized allyl glycidyl ether, and 2%–10% of a polymerized allyl ether of a mono(primary hydroxy)alkanoic acid of two to six carbon atoms, inclusive. This copolymer may be prepared by subjecting to polymerization conditions a mixture of the three monomeric components.

In a more preferred form, the proportion, by weight, of polyvinyl chloride in the copolymer is between 75% and 85%, that of the allyl glycidyl ether between 10% and 18%, and that of the allyl ether of the hydroxyalkanoic acid between 4% and 8%. These preferred proportions give the best cures with mild curing agents and optimum coating properties. Thus, the preferred ratios (by weight) of the allyl glycidyl ether and the allyloxyalkanoic acid are between 1.25:1 and 4.5:1, as the best coatings are obtained with copolymers within these ratios. However, satisfactory results are obtained within the entire range, i. e., when the weight ratio of allyl glycidyl ether to allyloxyalkanoic acid ranges from 1:1 to 14:1.

Although the copolymerization of vinyl chloride with certain other polymerizable compounds, including allyl glycidyl ether, has been proposed heretofore, it has now been found that the combination of allyl glycidyl ether with the aforementioned allyloxyalkanoic acids is unexpectedly outstanding in its polymerization behaviour with vinyl chloride and in its ability to impart stability to heat and light, as well as heat curability and other desirable properties to the resulting copolymer, when used in the proportions stated.

Allyl glycidyl ether, which has the formula

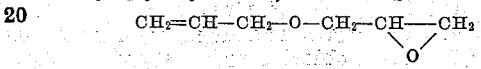

is a liquid boiling at 87.5–88° C., at 80 mm. pressure $n_D^{20}$ 1.4345, $d_4^{20}$ 0.9678. It may be prepared by dehydrohalogenation of the corresponding chlorohydrin, as described in U. S. Patent 2,314,039.

The third essential component of the polymerization mixture is an allyl ether of a hydroxyalkanoic acid of two to six carbon atoms, in which the hydroxyl group is primary, i. e., attached to a —CH$_2$— group. Otherwise stated, it is an alkanoic acid of two to six carbon atoms having an allyloxy group, CH$_2$=CH—CH$_2$—O—, attached to a —CH$_2$— group. Among the suitable allyloxyalkanoic acids are allyloxyacetic acid, beta-allyloxypropionic acid, gamma-allyloxybutyric acid, delta-allyloxyvaleric acid, epsilon-allyloxycaproic acid, beta-allyloxyisobutyric acid, beta-allyloxyalpha, alpha-dimethyl-propionic acid, and the like. The preferred compounds are the allyloxyalkanoic acids of the formula

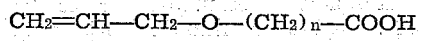

where $n$ is an integer from 1 to 5, inclusive. Allyloxyalkanoic acids, in particular allyloxyacetic acid, can be prepared by methods described in the chemical literature, for example, in U. S. Patents 2,302,618; 2,384,817; 2,406,590 and 2,448,246.

The chief beneficial result observed by introduction of the third component, i. e., the allyloxyalkanoic acid, into the copolymer lies in the fact that heat curability (insolubilization) of the polymers is greatly improved thereby. One advantage resulting from this fact is that the polymers can be insolubilized at lower temperatures than is possible in the absence of the allyloxyalkanoic acid, thus minimizing the danger of heat discoloration in industrial practice. In addition, these copolymers have the advantage of superior versatility in that they can be heat-cured with mild, non-acidic agents such as urea-formaldehyde resins, which do not give complete cure with vinyl chloride/allyl glycidyl ether copolymers. This results in a further improvement in heat stability, since urea-formaldehyde resins or similar resins tend to improve the inherent thermal stability of the copolymers of this invention.

The invention is illustrated in greater detail in the following examples in which parts are by weight unless otherwise noted.

*Example I*

A stainless steel reactor was swept with oxygen-free nitrogen and charged with 36 parts of allyloxyacetic acid, 144 parts of allyl glycidyl ether, 262 parts of thiophene-free benzene, and 6 parts of alpha,alpha'-azodiisobutyronitrile. The reactor was then evacuated to a pressure of 90–100 mm., closed, cooled in a solid carbon dioxide/acetone bath and charged with 422 parts of vinyl chloride introduced by distillation. The reactor was heated at 57° C.–63° C. (average 60° C.) and maintained at that temperature for 18 hours with agitation, the maximum internal pressure being 60 lb./sq. in. After cooling to room temperature and releasing the residual pressure, the benzene solution of the reaction product was poured into a 4- to 6-fold volume of methanol, whereupon the polymer coagulated. The polymer was separated, air-dried, and redissolved in acetone. The acetone solution was poured into methanol and the reprecipitated polymer was filtered and dried under reduced pressure. There was obtained 148 parts of vinyl chloride/allyl glycidyl ether/allyloxyacetic acid copolymer containing 76.9% vinyl chloride as calculated from its chlorine content of 43.6%.

This copolymer showed superior heat and light stability on comparison with a commercial vinyl chloride/vinyl acetate copolymer when tested in the form of coatings of 1–2 ml. thickness on phosphate-treated steel. On baking the vinyl chloride/allyl glycidyl ether/allyloxyacetic acid copolymer coatings for 30 minutes at a temperature of 177° C., there was no evidence of disintegration, whereas the vinyl chloride/vinyl acetate copolymer coating began to blacken when heated 30 minutes at 149° C. and was quite black and disintegrated in 30 minutes at 177° C.

The copolymer of this example was initially soluble in solvents such as acetone, cyclohexanone or a 1:1 mixture of xylene and methyl isobutyl ketone. Upon baking coatings of this copolymer at 149° C. for 30 minutes, there were obtained tough films insoluble in the above-mentioned solvents. By addition to the copolymer of 2% of butanol-modified urea-formaldehyde resin followed by baking 30 minutes at 121° C., there were obtained well-cured coatings having outstanding organic solvent insolubility as well as excellent hardness and heat-resistance.

*Example II*

A glass reactor was charged with 1.4 parts of sodium hydrazobis-methanesulfonate, 0.14 part of cupric chloride, 80 parts of water, 125 parts of ethanol, 3.5 parts of allyloxyacetic acid, and 12.2 parts of allyl glycidyl ether, then cooled to −70° C. and further charged with 20 parts of 3% hydrogen peroxide and 24 parts of liquid vinyl chloride. The reactor was purged with nitrogen, sealed, allowed to warm to room temperature (25° C.±2° C.) and maintained at that temperature for 2 hours. After cooling and releasing the residual pressure, the reactor was discharged. The polymer was filtered off, thoroughly washed with water to remove water-soluble solids, washed with methanol and dried under reduced pressure. There was obtained 12.4 parts of a white copolymer of vinyl chloride, allyl glycidyl ether, and allyloxyacetic acid which contained 83.6% by weight of vinyl chloride, as indicated by its chlorine content of 47.5%, and 5.1% of allyloxyacetic acid, as indicated by an acid number of 24.7. A 30% solution of this copolymer in cyclohexanone had a viscosity of 3.0 poises at 25° C.

Enamels containing 40% total solids were prepared from 10 parts of the above copolymer, 8 parts of rutile titanium dioxide pigment, 0.36 part of a butanol-modified urea-formaldehyde resin and 28.4 parts of a mixture of equal parts of xylene and methyl isobutyl ketone. Coatings applied at 1–2 mil thickness over phosphatized steel and baked 30 minutes at 121° C. had excellent properties, including gloss, color, flexibility, resistance to printing at 93° C. and resistance to attack by organic solvents or hot soap solutions. Addition to the enamel of 2%, based on total solids, of a soluble lead salt, such as basic lead octoate, gave a composition which cured well at 121° C. and was unchanged in properties when baked at temperatures as high as 150° C.

*Example III*

A copolymer was prepared as described in Example I, using 18 parts of allyloxyacetic acid, 162 parts of allyl glycidyl ether, 420 parts of vinyl chloride, 6 parts of alpha,alpha'-azodiisobutyronitrile, and 262 parts of benzene. This mixture was heated at 60° C. for 18 hours, the maximum internal pressure being 70 lbs./sq. in. There was obtained 191 parts of a vinyl chloride/allyl glycidyl ether/allyloxyacetic acid copolymer containing 81.5% of polymerized vinyl chloride and having a viscosity of 1.83 poises in 30% cyclohexanone solution at 25° C. This copolymer, when mixed with 2% of a butanol-modified urea-formaldehyde resin and baked 30 minutes at 149° C., gave flexible films insoluble in the common organic solvents.

*Example IV*

A copolymer was prepared as in Example I, using 45 parts of allyloxyacetic acid, 45 parts of allyl glycidyl ether, 217 parts of vinyl chloride, 3 parts of alpha,alpha'-azodiisobutyronitrile, and 131 parts of benzene and heating the mixture at 60° C. for 18 hours. There was obtained 90 parts of a copolymer containing 79.3% of polymerized vinyl chloride and having a viscosity of 2.13 poises in 30% cyclohexanone solution at 25° C. When treated with 2% of a butanol-modified urea-formaldehyde resin, this polymer cured readily in 30 minutes at 121° C. to give films having excellent flexibility, toughness, impact resistance and solvent resistance.

*Example V*

A copolymer was prepared by the procedure of Example I using 218 parts of vinyl chloride, 70 parts of allyl glycidyl ether, 20 parts of allyloxypropionic acid, 3 parts of alpha,alpha'-azodiisobutyronitrile and 131 parts of benzene. This mixture was heated at 60° C. for 18 hours in a stainless steel reaction vessel. There was obtained 72 parts of a vinyl chloride/allyl glycidyl ether/allyloxypropionic acid copolymer containing 81% of polymerized vinyl chloride (46% chlorine) and 12.3% of polymerized allyl glycidyl ether. This polymer had a viscosity of 1.83 poises in 30% cyclohexanone solution at 25° C. It was similar to the copolymer of Example I in solubility, heat stability and curing properties in baked coatings.

The allyloxypropionic acid used in this example was prepared by condensing beta-propiolactone with allyl alcohol. It had a boiling point of 92° C. at 0.5 mm. pressure, a refractive index $N_D^{25}$ of 1.4399 and an acid number of 437 (calculated 431).

*Example VI*

A copolymer was prepared as in Example I by heating at 60° C. for 18 hours a mixture of 202 parts of vinyl chloride, 75 parts of allyl glycidyl ether, 25 parts of allyloxypropionic acid, 3 parts of alpha,alpha'-azodiisobutyronitrile and 131 parts of benzene. There was obtained 71 parts of copolymer containing 78.2% of polymerized vinyl chloride and having a viscosity of 1.33 poises in 30% cyclohexanone solution at 25° C. This polymer cured readily in the presence of 2% of a butanol-modified urea formaldehyde resin at 149° C. and showed superior heat stability.

It will be understood that the above examples are merely illustrative and that the present invention broadly comprises a copolymer, the polymeric components of which essentially consist of, by weight, 70%-85% polymerized vinyl chloride, 10%-28% polymerized allyl glycidyl ether, and 2%-10% of a polymerized allyl ether of a mono-(primary hydroxy) alkanoic acid of 2 to 6 carbon atoms, inclusive.

The vinyl chloride/allyl glycidyl ether/allyloxyalkanoic acid copolymers of this invention may also contain minor amounts, up to about 25% by weight of the total polymeric material, of other copolymerized ingredients. These may be the polymerization products of any unsaturated compound copolymerizable with vinyl chloride, preferably a monoethylenic compound having a terminal methylene group attached by a double bond to the rest of the molecule. Examples of such compounds are ethylene, isobutylene, vinyl trimethylacetate, methyl methacrylate, acrylonitrile, dimethyl fumarate, allyloxyethanol, glyceryl alpha-monoallyl ether, allyl ethers of glycerol monochlorohydrin, di(beta-hydroxyethyl)maleate, vinylidene chloride, tetrafluoroethylene, etc.

The copolymers of this invention may also have combined with them various extraneous non-polymerizable adjuvants such as dyes, pigments, reinforcing agents, fillers, plasticizers, stabilizers, oils, etc. Polymeric modifiers such as nondrying oil-modified alkyd resins, or various vinyl chloride copolymers, are especially useful.

The copolymers of this invention are prepared by polymerizing together and in suitable proportions vinyl chloride, allyl glycidyl ether, and an allyloxyalkanoic acid as above defined, alone or, optionally, with one or more additional polymerizable components in minor amount. The proportions of polymerized allyl glycidyl ether and allyloxyalkanoic acid in the resulting polymer are fairly close to their relative proportions in the monomeric mixture but the vinyl chloride has a tendency to polymerize somewhat faster than the other components and, therefore, to appear in the polymer in somewhat greater proportion than in the monomeric mixture.

The actual composition of the polymer depends to some extent on the conversion and the particular conditions of polymerization and to determine the composition of the resulting copolymer within practical limits necessitates determining the proportion of vinyl chloride by analysis. A readily carried out determination of the chlorine content will establish the proportion of polymerized vinyl chloride in the copolymer which will usually run from 5% to 10% greater than in the monomeric mixture or sometimes up to as much as 25% more, particularly when the low temperature polymerization initiators discussed hereinafter are used.

Determining the proportion of allyl glycidyl ether and allyloxyalkanoic acid is much more difficult and subject to error. It has been found that as a matter of practice and for the degree of accuracy required by this invention, the proportion of these latter two components need not be determined by analysis but simply can be assumed to be substantially the relative proportion of these two with respect to each other in the monomeric mixture. Thus, if analysis shows that the vinyl chloride component of the copolymer is between 70% and 85% and the allyl glycidyl ether and allyloxyalkanoic acid were present in the monomeric mixture in the proportion between 1:1 and 14:1, the copolymer will, for all practical purposes, be within the proportion range of this invention and be the improved copolymer of this invention. As a general rule, copolymers within the desired range of proportion of the three components are obtained from monomer mixtures containing, by weight, from 50% to 80% of vinyl chloride, from 15% to 40% of allyl glycidyl ether, and from 3% to 15% of allyloxyalkanoic acid. Further, if analysis shows that the vinyl chloride component of the copolymer is between 75% and 85% and the allyl glycidyl ether and allyloxyalkanoic acid were present in the original mixture in the proportion between 1.25:1 and 4.5:1, the copolymer will, for all practical purposes, be within the preferred proportion range of this invention. It will be understood that it is not contended the relative proportion of allyl glycidyl ether and allyloxyalkanoic acid to each other remains identically the same in the copolymer as it was in the monomeric mixture but that the variation is not material.

The preferred polymerization initiators are those of the free radical-generating type such as organic or inorganic peroxides, e. g., hydrogen peroxide, benzoyl peroxide, lauroyl peroxide, tert.-butyl hydroperoxide, diethyl peroxide, and the like; or the persalts such as ammonium, potassium, or sodium persulfates, perborates, or percarbonates, with or without reducing adjuvants such as sulfur dioxide, sodium sulfite, sodium hydrosulfite, etc.; or the azo compounds described in U. S. Patent 2,471,959, e. g., the azonitriles such as alpha,alpha'-azodiisobutyronitrile; alpha,alpha'-azobis(alpha,gamma-dimethylvaleronitrile); dimethyl alpha,alpha'-azodiisobutyrate; 1,1'-azodicyclohexanecarbonitrile and the like. The azonitrile initiators are preferred in the production of the copolymers of this invention since they give products having the best thermal stability.

Excellent initiators for use in aqueous systems are the following recently proposed combinations: a water-soluble metal thiocyanate with hydrogen peroxide or an organic hydroperoxide (as disclosed in application Serial No. 138,525, filed by E. G. Howard on January 13, 1950); a salt of a hydrazobisalkanesulfonic acid, such as sodium hydrazobismethanesulfonate, with hydrogen peroxide and a cupric or ferric ion (as disclosed in application Serial No. 141,867, filed by E. G. Howard on February 1, 1950 and now Patent No. 2,589,258). These systems are effective at remarkably low temperatures, e. g., between $-25°$ C. and $+40°$ C. The catalyst need be used only in minor amounts, e. g., between 0.01% and 5% based on the weight of the total polymerizable materials.

The polymerization can be carried out under a variety of conditions. While a solvent is not essential, it is convenient in practice to use a liquid medium which dissolves the monomers and catalyst. Any inert solvent may be used, including those which are also solvents for the polymer, e. g., aromatic hydrocarbons such as benzene, toluene, and the xylenes or ketones such as acetone, methyl isobutyl ketone, cyclohexanone, etc., and those which do not dissolve the polymer, such as methanol, ethanol, butanol, tert.-butyl alcohol, acetic acid, aliphatic hydrocarbons, etc. Alternatively, the polymerization may be carried out in aqueous systems, with or without dispersing or emulsifying agents.

The polymerization mixture may include ingredients such as tert.-butyl or tert.-amyl alcohols which generally act as buffers in vinyl chloride polymerization to neutralize the hydrogen chloride which may be formed, or maleic anhydride which often confers better adhesive properties. However, these adjuvants are by no means necessary since allyl glycidyl ether itself acts as a buffer and since the allyl glycidyl ether/vinyl chloride/allyloxyalkanoic acid copolymers themselves have excellent adhesive properties.

The polymerization temperature is not critical. At low temperatures, e. g., 0-10° C., the reaction is rather slow except when the low temperature initiators mentioned above are employed, in which case the reaction may be carried out even at temperatures as low as $-25°$ C. It is usually expedient to operate at temperatures above 25° C. and preferably between 40° C. and 100° C. In view of the volatility of vinyl chloride, it is desirable to use sealed reactors. The reaction may be carried out under the autogenous pressure of the reactants at the reaction temperature but, if desired, additional pressure may be applied, e. g., vinyl chloride pressure, or that of an additional gaseous monomer such as ethylene, or that of an inert gas such as nitrogen.

The reaction product is obtained as a colorless or light-colored solid copolymer, which has the advantage of ready solubility in many common solvents, particularly the aromatic mononuclear hydrocarbons and the aliphatic or alicyclic ketones. The polymer may be cured, that is, rendered insoluble in the same solvents, by means of a heat treatment at temperatures between about 120° C. and 250° C. for periods varying, depending on the temperature, between 10 and 45 minutes. However, the heat-curing or thermosetting of the copolymer is preferably carried out with the aid of small amounts, from 0.1 to 5% by weight, of curing or thermosetting agents. Preferably, the curing agents are organic solvent-soluble urea-formaldehyde or melamine-formaldehyde resins, which may be used as such or in conjunction with an acidic catalyst. With the help of such agents, it is possible to insolubilize the resins at lower temperatures, for example, by heating at 100 to 175° C. for 10 to 30 minutes; or, alternatively, at higher temperatures, such as 140-250° C., but in less time than is possible at the same temperature without a curing agent. After complete curing, the resins are substantially insoluble in and unaffected by the common solvents, including those, such as aromatic hydrocarbons or ketones, which dissolved them before the heat treatment.

The copolymers of this invention are particularly useful in the coating and impregnating of porous surfaces such as textiles, e. g., cotton fabrics or regenerated cellulose fabrics, paper, wood, brick, etc., and in the coating of nonporous surfaces such as iron, steel, glass, and the like. They are also useful in such applications as wire coating and can coating, and the preparation of molded and extruded articles, adhesives, unsupported films, fibers, and the like.

This application is a continuation of applicants' copending application Serial No. 170,704, filed June 27, 1950, and entitled "Polymeric Materials," now abandoned.

As many apparently widely different embodiments of this invention may be made without departing from the spirit and scope thereof, it is to be understood that the invention is not limited to the specific embodiments thereof except as defined in the appended claims.

The invention claimed is:

1. A copolymer, the polymeric components of which essentially consist of, by weight, 70%-85% polymerized vinyl chloride, 10%-28% polymerized allyl glycidyl ether, and 2%-10% of a polymerized allyl ether of a mono (primary hydroxy) alkanoic acid of two to six carbon atoms, inclusive.

2. A copolymer as recited in claim 1 wherein said allyl ether is an allyloxyalkanoic acid of the formula $CH_2=CH-CH_2-O-(CH_2)_n-COOH$ where $n$ is an integer of from 1 to 5, inclusive.

3. A copolymer as recited in claim 1 wherein said allyl ether is allyloxyacetic acid.

4. A copolymer, the polymeric components of which essentially consist of, by weight, 75%-85% polymerized vinyl chloride, 10%-18% polymerized allyl glycidyl ether, and 4%-8% of a polymerized allyl ether of a mono (primary hydroxy) alkanoic acid of two to six carbon atoms, inclusive.

5. A copolymer as recited in claim 4 wherein said allyl ether is an allyloxyalkanoic acid of the formula $CH_2=CH-CH_2-O-(CH_2)_n-COOH$ where $n$ is an integer of from 1 to 5, inclusive.

6. A copolymer as recited in claim 4 wherein said allyl ether is allyloxyacetic acid.

7. A cured copolymer as set forth in claim 1, said copolymer having been cured in the presence of an organic solvent-soluble resin from the group consisting of urea-formaldehyde and melamine-formaldehyde.

8. Process of curing which comprises heating the copolymer set forth in claim 1 at a temperature of 120° C. to 250° C. in the presence of an organic solvent-soluble resin from the group consisting of urea-formaldehyde and melamine-formaldehyde.

9. Process set forth in claim 8 wherein said curing is carried out in the presence of a butanol-modified urea-formaldehyde resin.

ELLSWORTH K. ELLINGBOE.
HENRY SHIRLEY ROTHROCK.

No references cited.